US007490191B2

(12) United States Patent
Illikkal et al.

(10) Patent No.: US 7,490,191 B2
(45) Date of Patent: Feb. 10, 2009

(54) SHARING INFORMATION BETWEEN GUESTS IN A VIRTUAL MACHINE ENVIRONMENT

(75) Inventors: Rameshkumar G. Illikkal, Portland, OR (US); Donald K. Newell, Portland, OR (US); Ravishankar Iyer, Portland, OR (US); Srihari Makineni, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 11/525,980

(22) Filed: Sep. 22, 2006

(65) Prior Publication Data

US 2008/0077765 A1    Mar. 27, 2008

(51) Int. Cl.
*G06F 12/10* (2006.01)
(52) U.S. Cl. .............................. 711/6; 711/203; 711/207
(58) Field of Classification Search ........................ None
See application file for complete search history.

(56) References Cited

U.S. PATENT DOCUMENTS

| 5,230,069 | A | | 7/1993 | Brelsford | |
|---|---|---|---|---|---|
| 5,555,385 | A | * | 9/1996 | Osisek | 711/1 |
| 5,621,912 | A | * | 4/1997 | Borruso et al. | 718/1 |
| 6,453,392 | B1 | | 9/2002 | Flynn | |
| 6,961,806 | B1 | | 11/2005 | Agesen | |
| 7,020,738 | B2 | * | 3/2006 | Neiger et al. | 711/6 |
| 7,035,963 | B2 | * | 4/2006 | Neiger et al. | 711/6 |
| 2003/0120856 | A1 | * | 6/2003 | Neiger et al. | 711/6 |
| 2004/0064813 | A1 | * | 4/2004 | Neiger et al. | 718/1 |
| 2006/0206658 | A1 | | 9/2006 | Hendel | |
| 2008/0104586 | A1 | * | 5/2008 | Thorton et al. | 718/1 |

* cited by examiner

*Primary Examiner*—Kevin Verbrugge
(74) *Attorney, Agent, or Firm*—Thomas R. Lane

(57) ABSTRACT

Embodiments of apparatuses, methods, and systems for sharing information between guests in a virtual machine environment are disclosed. In one embodiment, an apparatus includes virtual machine control logic, an execution unit, and a memory management unit. The virtual machine control logic is to transfer control of the apparatus among a host and its guests. The execution unit is to execute an instruction to copy information from a virtual memory address in one guest's virtual address space to a virtual memory address in another guest's virtual address space. The memory management unit is to translate the virtual memory addresses to physical memory addresses.

20 Claims, 2 Drawing Sheets

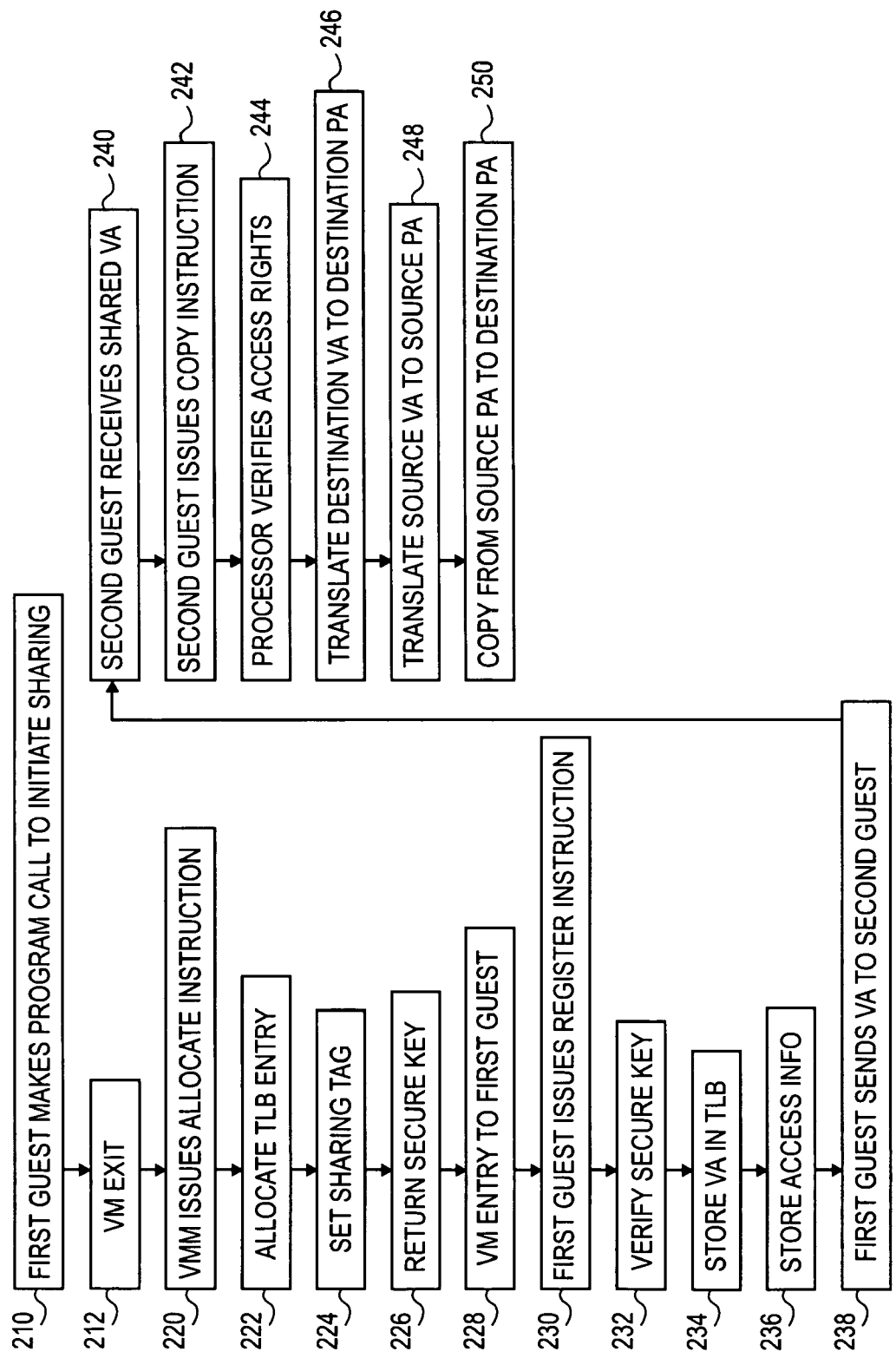

SHARING INFORMATION BETWEEN GUESTS IN A VIRTUAL MACHINE ENVIRONMENT

BACKGROUND

1. Field

The present disclosure pertains to the field of information processing, and more particularly, to the field of memory management in a virtual machine environment.

2. Description of Related Art

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of, and may or may not be aware of, the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be "intercepted," i.e., cause the processor to exit the virtualization environment so that a VMM may operate, for example, to implement virtualization policies. A physical processor may also support other instructions for maintaining a virtualization environment, and may include memory or register bits that indicate or control virtualization capabilities of the physical processor.

A physical processor supporting a virtualization environment may include a memory management unit for translating virtual memory addresses to physical memory addresses. A VMM may need to retain ultimate control over the memory management unit to protect the memory space of one guest from the memory space of another guest. Therefore, prior approaches to sharing information between guests have included adding portions of each guests' memory space to the VMM's memory space so that the VMM can copy information from one guest's memory space to another guest's memory space, such that each time a guest attempts to copy information to another guest, a transfer of control of the processor from the guest to the VMM and another transfer of control from the VMM back to the guest are performed. Typically, each such transfer of control from a guest to the VMM includes saving guest state and loading host state, and each such transfer of control from the VMM to the guest includes saving host state and loading guest state.

BRIEF DESCRIPTION OF THE FIGURES

The present invention is illustrated by way of example and not limitation in the accompanying figures.

FIG. 2 illustrates an embodiment of the present invention in a method for sharing information between guests in a virtual machine environment.

DETAILED DESCRIPTION

Figure 1:
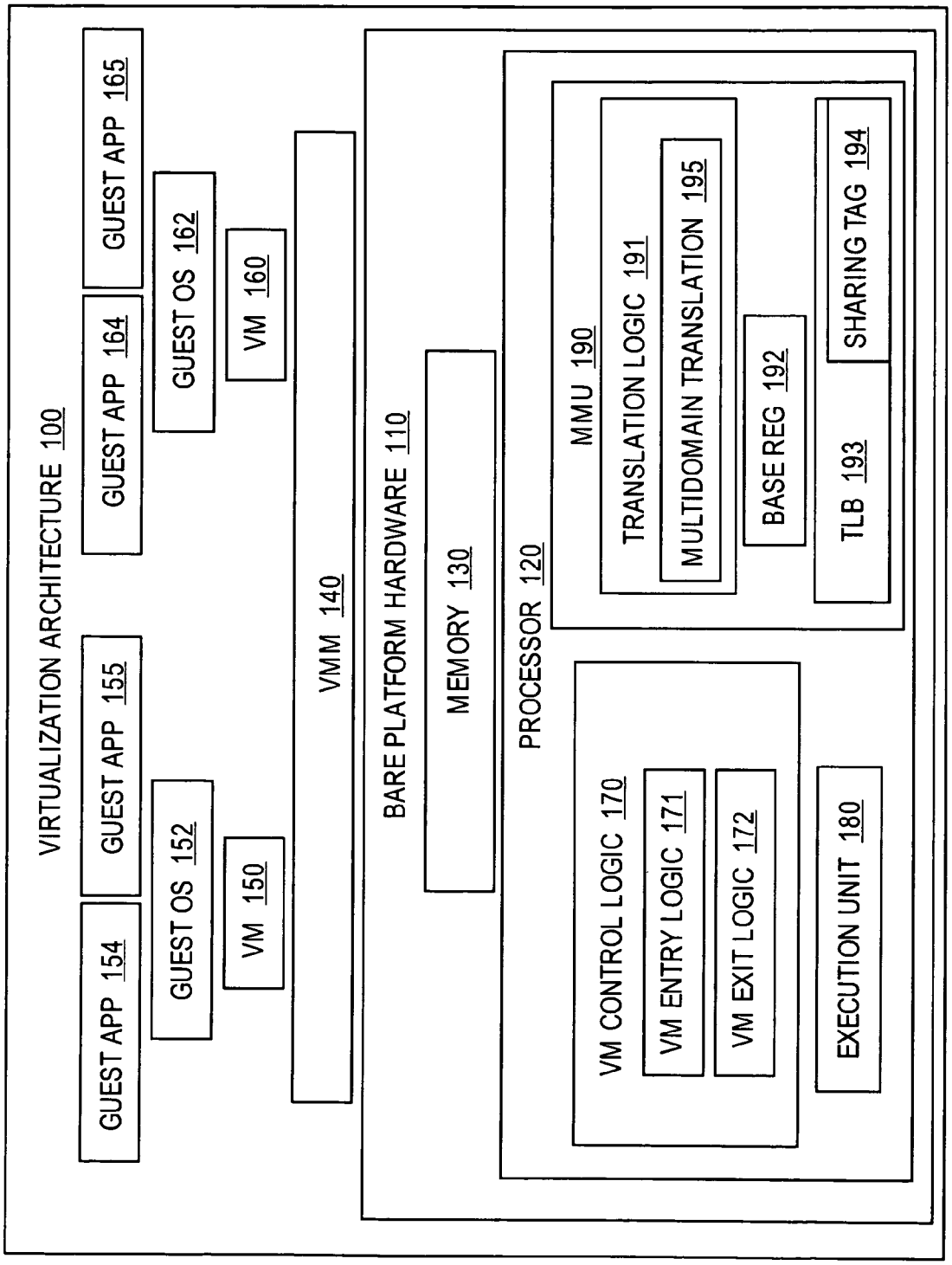
FIG. 1 illustrates an embodiment of the present invention in a virtualization architecture.

Embodiments of apparatuses, methods, and systems for sharing information between guests in a virtual machine environment are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

The performance of a virtual machine environment may be improved by reducing the number of transfers of control between guests and a host. Embodiments of the present invention may be used to reduce the number of such transfers necessary to copy information from one guest to another guest. Therefore, performance may be improved over a virtual machine environment in which each time a guest attempts to copy information to another guest, a transfer of control of the processor from the guest to the VMM and another transfer of control from the VMM back to the guest are performed. Performance may be further improved by not requiring a VMM's memory management data structures to be modified to include shared portions of guest memory.

FIG. 1 illustrates an embodiment of the present invention in virtualization architecture 100. Although FIG. 1 shows the invention embodied in a virtualization architecture, the invention may also be embodied in other architectures, systems, platforms, or environments. For example, an embodiment of the invention may support sharing information between applications in a micro-kernel or decomposed operating system environment.

In FIG. 1, bare platform hardware 110 may be any data processing apparatus capable of executing any OS or VMM software. For example, bare platform hardware may be that of a personal computer, mainframe computer, portable computer, handheld device, set-top box, server, or any other computing system. Bare platform hardware 110 includes processor 120 and memory 130.

Processor 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows only one such processor 120, bare platform hardware 110 may include any number of processors, including any number of multicore processors, each with any number of execution cores, and any number of multithreaded processors, each with any number of threads.

Memory 130 may be static or dynamic random access memory, semiconductor-based read-only or flash memory, magnetic or optical disk memory, any other type of medium readable by processor 120, or any combination of such mediums. Processor 120 and memory 130 may be coupled to or communicate with each other according to any known approach, such as directly or indirectly through one or more buses, point-to-point, or other wired or wireless connections.

Bare platform hardware 110 may also include any number of additional devices or connections.

In addition to bare platform hardware 100, FIG. 1 illustrates VMM 140, VMs 150 and 160, guest operating systems 152 and 162, and guest applications 154, 155, 164, and 165.

VMM 140 may be any software, firmware, or hardware host installed on or accessible to bare platform hardware 110, to present VMs, i.e., abstractions of bare platform hardware 110, to guests, or to otherwise create VMs, manage VMs, and implement virtualization policies. In other embodiments, a host may be any VMM, hypervisor, OS, or other software, firmware, or hardware capable of controlling bare platform hardware 110. A guest may be any OS, any VMM, including another instance of VMM 140, any hypervisor, or any application or other software.

Each guest expects to access physical resources, such as processor and platform registers, memory, and input/output devices, of bare platform hardware 110, according to the architecture of the processor and the platform presented in the VM. FIG. 1 shows two VMs, 150 and 160, with guest OS 152 and guest applications 154 and 155 installed on VM 150 and guest OS 162 and guest applications 164 and 165 installed on VM 160. Although FIG. 1 shows only two VMs and two applications per VM, any number of VMs may be created, and any number of applications may run on each VM within the scope of the present invention.

A resource that can be accessed by a guest may either be classified as a "privileged" or a "non-privileged" resource. For a privileged resource, VMM 140 facilitates the functionality desired by the guest while retaining ultimate control over the resource. Non-privileged resources do not need to be controlled by VMM 140 and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "virtualization events" herein. Some of these virtualization events are referred to as "privileged events" because they must be handled by VMM 140 to ensure proper operation of VMs 150 and 160, protection of VMM 140 from guests, and protection of guests from each other.

At any given time, processor 120 may be executing instructions from VMM 140 or any guest, thus VMM 140 or the guest may be running on, or in control of, processor 120. When a privileged event occurs or a guest attempts to access a privileged resource, control may be transferred from the guest to VMM 140. The transfer of control from a guest to VMM 140 is referred to as a "VM exit" herein. After handling the event or facilitating the access to the resource appropriately, VMM 140 may return control to a guest. The transfer of control from VMM 140 to a guest is referred to as a "VM entry" herein.

Processor 120 includes virtual machine control logic 170 to support virtualization, including the transfer of control of processor 120 among a host, such as VMM 140, and guests, such as guest operating systems 152 and 162 and guest applications 154, 155, 164, and 165. Virtual machine control logic 170 may be microcode, programmable logic, hard-coded logic, or any other form of control logic within processor 120. In other embodiments, virtual machine control logic 170 may be implemented in any form of hardware, software, or firmware, such as a processor abstraction layer, within a processor or within any component accessible or medium readable by a processor, such as memory 130.

Virtual machine control logic 170 includes VM entry logic 171 to transfer control of processor 120 from a host to a guest (i.e., a VM entry) and VM exit logic 172 to transfer control of processor 120 from a guest to a host (i.e., a VM exit). In some embodiments, control may also be transferred from a guest to a guest or from a host to a host. For example, in an embodiment supporting layered virtualization, software running on a VM on processor 120 may be both a guest and a host (e.g., a VMM running on a VM is a guest to the VMM that controls that VM and a host to a guest running on a VM that it controls).

Processor 120 also includes execution unit 180, to execute instructions issued by a host or a guest as described below, and memory management unit ("MMU") 190, to manage the virtual and physical memory space of processor 120. MMU 190 supports the use of virtual memory to provide software, including guest software running in a VM and host software running outside a VM, with an address space for storing and accessing code and data that is larger than the address space of the physical memory in the system, e.g., memory 130. The virtual memory space of processor 120 may be limited only by the number of address bits available to software running on the processor, while the physical memory space of processor 120 is further limited to the size of memory 130. MMU 190 supports a memory management scheme (paging in this embodiment), to swap the executing software's code and data in and out of memory 130 on an as-needed basis. As part of this scheme, the software may access the virtual memory space of the processor with a virtual address that is translated by the processor to a second address that the processor may use to access the physical memory space of the processor.

Accordingly, MMU 190 includes translation logic 191, paging base register 192, and translation lookaside buffer ("TLB") 193. Translation logic 191 is to perform address translations, for example the translation of a virtual address to a physical address, according to any known memory management technique, such as paging. As used herein, the term "virtual address" includes any address referred to as a logical or a linear address. To perform these address translations, translation logic 191 refers to one or more data structures stored in processor 120, memory 130, any other storage location in bare platform hardware 110 not shown in FIG. 1, and/or any combination of these components and locations. The data structures may include page directories and page tables according to the architecture of the Pentium® Processor Family, as modified according to embodiments of the present invention, and/or a table stored in a TLB, such as TLB 193.

Paging base register 192 may be any register or other storage location used to store a pointer to a data structure used by translation logic 191. In one embodiment, paging base register 192 may be that portion of the CR3 register referred to as PML4 Base, used to store the page map level 4 base address, according to the architecture of the Pentium® Processor Family.

In one embodiment, translation logic 191 receives a linear address provided by an instruction to be executed by processor 120. Translation logic 191 uses portions of the linear address as indices into hierarchical tables, including page tables, to perform a page walk. The page tables contain entries, each including a field for a base address of a page in memory 130, for example, bits 39:12 of a page table entry according to the Pentium® Processor Family's Extended Memory 64 Technology. Any page size (e.g., 4 kilobytes) may be used within the scope of the present invention. Therefore, the linear address used by a program to access memory 130 may be translated to a physical address used by processor 120 to access memory 130.

The linear address and the corresponding physical address may be stored in TLB 193, so that the appropriate physical address for future accesses using the same linear address may be found in TLB 193 and another page walk is not required. The contents of TLB 193 may be flushed when appropriate, for example on a software context switch, typically by an operating system.

In a virtual machine environment, VMM 140 may need to have ultimate control over the resources of MMU 190 in order to protect the memory space of one guest from another guest. Therefore, in one embodiment, virtual machine control logic 170 may include logic to cause a VM exit if a guest issues an instruction that is intended to change the contents of paging base register 192 or TLB 193, or otherwise modify the operation of MMU 190. The VMM can then maintain MMU 190 along with multiple sets of paging or other data structures (e.g., one set per VM) to provide for correct operation of bare platform hardware 110 together with a virtual machine environment in which each virtual machine appears to provide complete control of its memory management resources to an OS.

In another embodiment, MMU 190 may include hardware to support virtualization. For example, translation logic 191 may be configured to translate a linear address to a physical address, using a data structure pointed to by the contents of paging base register 192, as described above. If this translation is performed for a guest, the linear address is referred to as a guest linear address and the resulting physical address is referred to as a guest physical address, and a second translation is performed to translate the guest physical address to a host physical address, using a second data structure pointed to by a second pointer. In this embodiment, the paging base register 192 and the first translation data structure may be maintained by an OS running on a virtual machine, while the second pointer and the second translation data structure are maintained by a VMM. The second translation may be enabled by a VM entry and disabled by a VM exit.

Returning to execution unit 180, in this embodiment, execution unit 180 is configured to execute instructions that may be issued by a host or a guest. These instructions include an instruction to allocate a portion of TLB 193 (and/or another structure in processor 120 or bare platform hardware 110, such as memory 130) for a guest to use for information sharing with other guests ("allocate" instruction), an instruction to register a portion of a guest's memory for sharing information with other guests ("register" instruction), and an instruction for one guest to copy information to or from another guest without causing a VM exit ("copy" instruction).

The allocate instruction may have a requestor identifier (ID) and a memory size associated with it, as operands, parameters, or according to any other explicit or implicit approach. The requestor ID may be a value unique to a virtual machine in a virtual machine environment, or an application in a decomposed OS environment. The requester ID identifies the VM or application that intends to make a portion of its memory space shareable, and the memory size indicates the size of the shareable memory space, for example, a number of pages.

The allocate instruction may be issued only by the entity having ultimate control of MMU 190, which, in this embodiment, is VMM 140. For example, if the allocate instruction is issued by a guest application with insufficient privilege, it may be ignored, or if it issued by a guest OS which believes it has sufficient privilege, it may cause a VM exit. The issuance of the allocate instruction by VMM 140 may be in response to a guest requesting, through a program call or other messaging protocol, to make a portion of its memory space shareable.

Execution unit 180 executes an allocate instruction, in this embodiment, by causing an entry location or locations in TLB 193 to be allocated to the requesting VM for information sharing. In other embodiments, a separate, dedicated TLB, or any other storage location or data structure in processor 120 or bare platform hardware 110 (e.g., memory 130), maybe used instead of TLB 193.

To support information sharing, TLB 193 may include sharing tag storage location 194, which provides for a sharing tag to be associated with each TLB entry, or with any number of groups of TLB entries. Therefore, execution of the allocate instruction may include setting the sharing tag or tags associated with the allocated TLB entry location(s) to the value of the requestor ID. TLB entries tagged for sharing are not flushed on a software context switch.

Execution of the allocate instruction may also cause a secure key, associated with the allocated TLB entry location(s), to be communicated to the requestor in a program call return or other messaging protocol. Allocated TLB entry locations may be released by a program call, other messaging protocol, or any other approach.

The register instruction may have ownership information and access information associated with it, as operands, parameters, or according to any other explicit or implicit approach. The ownership information may include the identity of the registering entity, in the form of a requester ID or in any other form, and the identity of the memory space to share, in the form of a virtual address of a page to be shared or in any other form. The access information may include the identity of one or more entities with which the memory space may be shared, in the form of an ID value analogous to a requestor ID or in any other form, and any desired access permissions, such as read permission and/or write permission. The register instruction may also have associated with it the secure key returned by the corresponding allocate instruction.

Execution of a register instruction, in this embodiment, may include verifying that the secure key associated with the register instruction has been issued to the registering entity through a previously executed allocate instruction, identifying the allocated TLB entry location and an associated physical address, and storing the virtual address provided by the registering entity in the allocated TLB entry location. The access information associated with the register instruction may be stored according to any approach that will allow it to be used to verify that a subsequent copy instruction is to be permitted, for example, in a storage location indexed by the requestor ID. In a case where a registering entity has not requested or not been allocated a TLB entry location, a register instruction may be executed by storing the access information without verifying a secure key or using a TLB entry.

The copy instruction may have a destination entity ID, a destination virtual address, and a source virtual address associated with it, as operands, parameters, or according to any other explicit or implicit approach. The destination entity ED may include an ID of a virtual machine and/or an application, in the form of a requestor ID or in any other form. A source entity ID for the copy instruction may be implied from the identity of the entity issuing the copy instruction.

Execution unit 180 executes a copy instruction, in this embodiment, by verifying that the copy instruction is to be permitted according to whatever approach was used in storing the access information from a corresponding register instruction, causing MMU 190 to translate the destination and source virtual addresses to physical addresses, and causing the information stored in the memory location identified by the source physical address to be copied to the memory location identified by the destination physical address.

MMU 190 translates the destination virtual address to a destination physical address by consulting TLB 193 to determine if a TLB entry has been registered for the destination virtual address. If so, the destination physical address is found in TLB 193. If not, MMU 190 translates by using the destination ID, or a pointer associated with the destination ID, rather than paging base register 192, to index into the appropriate data structure for the destination entity, providing scalability beyond the number of entries that TLB 193 can hold. In this embodiment, translation logic 191 includes multi-domain translation logic 195 to cause this address translation to be performed differently than a single domain address translation and to perform the access control function referred to above. However, any techniques used by MMU 190 to protect pages generally, such as generating page faults based on status, control, access, or other bits or fields in page directory and/or page table entries, may remain in place.

MMU 190 translates the source virtual address to the source physical address as described previously with respect to single domain address translations. Therefore, a copy between two virtual machines may be performed without a VM exit, allowing the copy operation to be completed in the execution context of a single VM. Embodiments of the invention may provide other instructions or operations (instead of or in addition to copy) with access to multiple VM domains.

FIG. 2 illustrates an embodiment of the present invention in method 200, a method for sharing information between guests in a virtual machine environment. Although method embodiments are not limited in this respect, reference is made to the description of virtualization architecture 100 of FIG. 1 to describe the method embodiment of FIG. 2.

In box 210 of FIG. 2, a first guest running on processor 120 makes a program call to initiate sharing of information with a second guest. In box 212, a VM exit is performed to transfer control of processor 120 from the first guest to VMM 140.

In box 220, VMM 140 issues an allocate instruction, as described above. In box 222, processor 120 allocates one or more TLB entry locations to the first guest. In box 224, processor 120 stores the requestor ID in the sharing tag storage location for the allocated TLB entry locations. In box 226, VMM returns a secure key to the first guest. In box 228, a VM entry is performed to transfer control of processor 120 from VMM 140 to the first guest.

In box 230, the first guest issues a register instruction to register a page for sharing. In box 232, processor 120 verifies the secure key. In box 234, processor 120 stores the virtual address of the page in the allocated TLB entry. In box 236, processor 120 stores the access information associated with the page. In box 238, the first guest communicates the sharing information (e.g., the virtual address, along with any other information to facilitate sharing) to the second guest, according to any desired message passing approach.

In box 240, the second guest receives the sharing information. In box 242, the second guest issues a copy instruction. In box 244, processor 120 verifies the access information associated with the destination address. In box 246, processor 120 translates the destination virtual address to the destination physical address. In box 248, processor 120 translates the source virtual address to the source physical address. In box 250, processor 120 copies the contents of memory location identified by the source physical address to the memory location identified by the destination physical address.

Within the scope of the present invention, method 200 may be performed in a different order, with illustrated boxes omitted, with additional boxes added, or with a combination of reordered, omitted, or additional boxes. For example, processor 120 may translate the source virtual address before or concurrently with translating the destination virtual address, e.g., boxes 246 and 248 may be rearranged.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses, methods, and systems for sharing information between guests in a virtual machine environment have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. For example, in another embodiment of the invention, the entity that requests the sharing of information may register the memory space that serves as the source rather than the destination.

In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   virtual machine control logic to transfer control of the apparatus among a host and a plurality of guests;
   an execution unit to execute a first instruction to copy information to a first virtual memory address in the virtual address space of a first guest of the plurality of guests from a second virtual memory address in the virtual address space of a second guest of the plurality of guests; and
   a memory management unit to translate the first virtual memory address to a first physical memory address and to translate the second virtual memory address to a second physical memory address.

2. The apparatus of claim 1, wherein the memory management unit includes a first storage location to store a first portion of first virtual memory address and a corresponding first portion of the first physical memory address.

3. The apparatus of claim 2, wherein the memory management unit includes a translation lookaside buffer including the first storage location.

4. The apparatus of claim 2, wherein the first storage location includes a tag storage location to store an identifier of the first guest.

5. The apparatus of claim 2, wherein first portion of first virtual memory address is a first virtual page number and the corresponding first portion of the first physical memory address is a first physical page number.

6. The apparatus of claim 2, wherein the execution unit is also to execute a second instruction to store the first portion of the first virtual memory address in the first storage location.

7. The apparatus of claim 6, wherein the execution unit is also to execute a third instruction to allocate the first storage location for the first guest to store the first portion of the first virtual memory address in the first storage location.

8. The apparatus of claim 7, wherein the virtual machine control logic includes exit logic to transfer control of the apparatus to the host in response to an attempt of one of the plurality of guests to issue the third instruction.

9. The apparatus of claim 1, wherein the memory management unit is to translate the first virtual memory address using a first address translation data structure for the first guest, and to translate the second virtual memory address using a second address translation data structure for the second guest.

10. The apparatus of claim 9, further comprising a first base address storage location to store a first pointer to the first address translation data structure.

11. A method comprising:
a first guest issuing a register instruction to register a shared memory space; and
a second guest issuing a copy instruction to copy the contents of a portion of the memory space of the second guest to the shared memory space.

12. The method of claim 11, further comprising a host issuing an allocate command to allocate the shared memory space to the first guest.

13. The method of claim 12, further comprising allocating an entry in a translation lookaside buffer for an address translation associated with the shared memory space.

14. The method of claim 13, further comprising storing an identifier of the first guest in a tag storage location associated with the entry in the translation lookaside buffer.

15. The method of claim 12, further comprising returning a secure key associated with the shared memory space to the first guest.

16. The method of claim 11, further comprising storing a first virtual memory address identifying the shared memory space in a translation lookaside buffer.

17. The method of claim 16, further comprising translating the first virtual memory address to a first physical memory address identifying the shared memory space.

18. The method of claim 17, further comprising translating a second virtual memory address identifying the portion of the memory space of the second guest to generate a second physical memory address identifying the portion of the memory space of the second guest.

19. A system comprising:
a memory to store information to be shared between a first guest and a second guest; and
a processor including:
virtual machine control logic to transfer control of the processor among a host, the first guest, and the second guest;
an execution unit to execute a first instruction to copy information to a first virtual memory address in the virtual address space of the first guest from a second virtual memory address in the virtual address space of the second guest; and
a memory management unit to translate the first virtual memory address to a first physical memory address and to translate the second virtual memory address to a second physical memory address.

20. The system of claim 19, wherein the memory is dynamic random access memory.

* * * * *